UNITED STATES PATENT OFFICE.

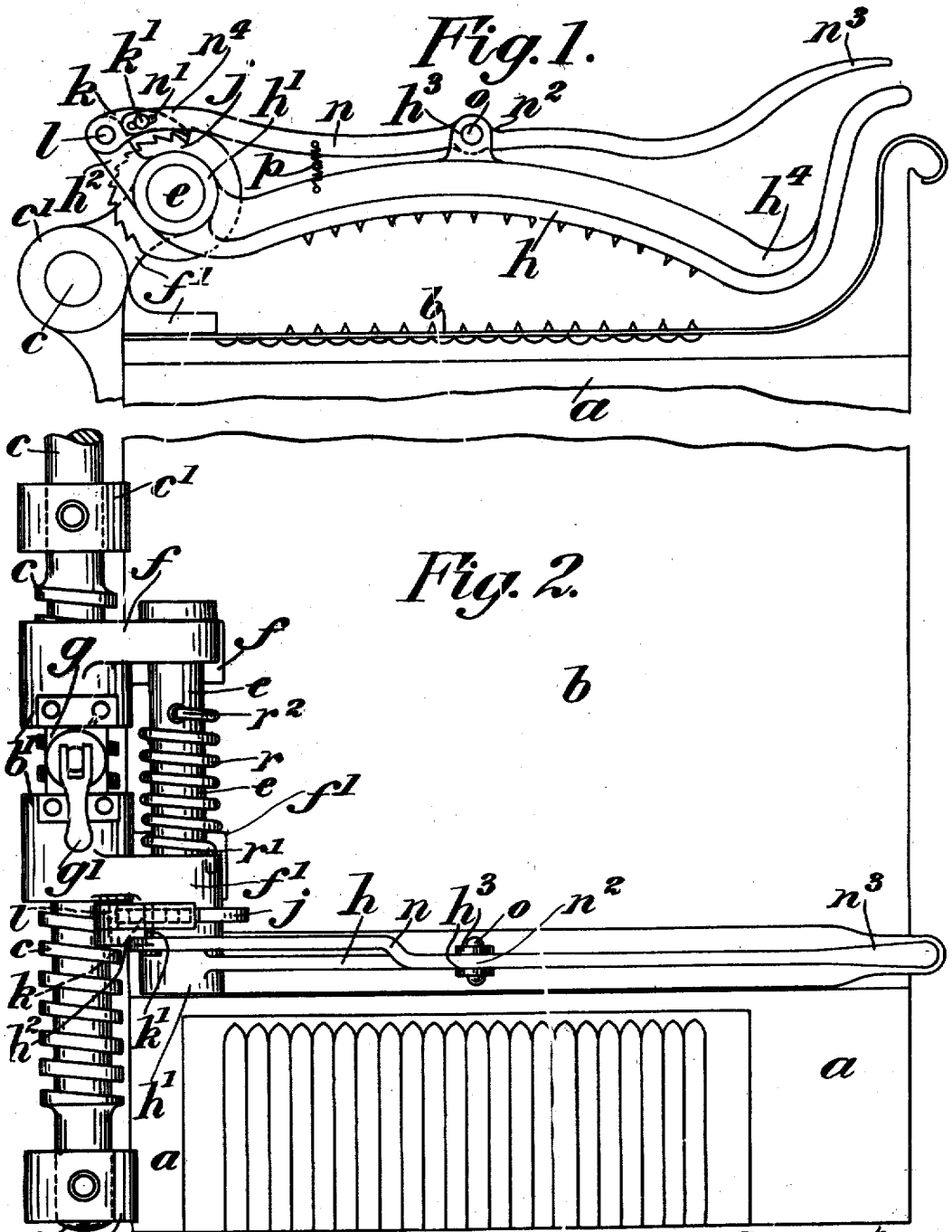

JOHANNES CORNELIS VAN BERKEL, OF ZURICH, SWITZERLAND.

MEAT-CLAMP FOR MEAT-SLICING MACHINES.

1,017,274.  Specification of Letters Patent.  Patented Feb. 13, 1912.

Application filed August 2, 1910. Serial No. 575,052.

*To all whom it may concern:*

Be it known that I, JOHANNES CORNELIS VAN BERKEL, a subject of the Queen of the Netherlands, residing at Zurich, Switzerland, agent, have invented a certain new and useful Improved Meat-Clamp for Meat-Slicing Machines, of which the following is a specification.

This invention relates to meat slicing machines and it has for its object to provide for the same an easily manipulated meat clamp adapted to take the place of the usual double upright rack and separate serrated clamp lever.

Under my invention the clamp lever, which is pivoted at one end thereof, is adapted to move through an arc of a circle and is held down upon the meat by spring pressure, means being also provided whereby the lever can be readily held in position and released.

In order that my invention may be clearly understood, I have hereunto appended an explanatory sheet of drawings, which shows, by way of illustration, one mode of carrying out the same.

Figure 1 is an end elevation of a slicing machine meat table provided with my improved meat clamp. Fig. 2 is a plan of the same.

Referring to the drawings:—$a$ is the meat table, $b$ the sliding meat plate thereon, and $c$ the feed screw for the meat plate.

In the arrangement shown I provide near the feed screw $c$, and parallel with it, a spindle $e$ which is rotatably supported in brackets $f$ and $f^1$ which are secured to the meat plate $b$ and have each a part $b^1$ surrounding the feed screw $c$.

$c^1$, $c^1$ are brackets fixed to the table and carrying the feed screw.

On the bracket $f^1$ is fixed a ratchet-wheel $j$. The brackets $f$, $f^1$, are connected together by a bridge $g$ which carries a cam lever $g^1$ for operating the usual saddle nut or half nut (not shown) of the feed screw $c$. When the half nut is in engagement with the feed screw $c$ and the latter is rotating, the half nut will be moved along the feed screw and it will carry with it the brackets $f$ and $f^1$ and the spindle $e$ and meat plate $b$.

Secured at one end of the spindle $e$ is a clamp lever $h$ which is serrated at its underside, the lever being, preferably, of curved shape, as shown in Fig. 1, and having a boss $h^1$ by means of which it is secured to the spindle $e$. A pawl $k$ is pivotally carried on a pin $l$ projecting from a projection $h^2$ on the boss $h^1$ of the clamp lever $h$ and this pawl $k$ is adapted to be put into and out of engagement with the teeth of the ratchet-wheel $j$ by means of a lever $n$ having a slot $n^1$ at one end $n^4$ thereof which engages a projection or pin $k^1$ on the pawl $k$. The lever $n$ is fulcrumed at $n^2$ on a pin $o$ carried by jaws $h^3$ on the top of the clamp lever $h$ and a spring $p$ is provided and secured to the lever $n$ and to the clamp lever $h$, as shown in Fig. 1, so that the slotted end of the lever $n$ is normally pulled downward and the pawl $k$ thereby kept in engagement with the teeth of the ratchet-wheel $j$. For ease in handling, the end $n^3$ of the lever $n$ is, preferably, shaped as shown in the drawings.

A torsion spring $r$ is arranged on the spindle $e$ and secured at one end $r^1$ to the bracket $f^1$ its other end $r^2$ being secured to the spindle $e$ and the arrangement is such that on the clamp $h$ being moved upward from the position shown at Fig. 1, and the spindle $e$ thereby caused to make a partial revolution, the spring $r$ will be put in tension, the pawl $k$ having, meantime, slipped over the teeth of the fixed ratchet-wheel $j$. When the end $h^4$ of the clamp $h$ has been raised the desired height the pawl $k$ engages one of the teeth of the ratchet-wheel $j$, thereby retaining the clamp $h$ in the desired position, the torsion spring $r$ being meanwhile held in compression. When the clamp is held up in this manner there is no danger of the same coming down on the operator's hands while laying meat on the meat plate. In order to bring the clamp $h$ into engagement with the meat on the meat table it is only necessary to depress the end $n^3$ of the lever $n$ thereby raising the slotted end $n^4$ thereof and raising the pawl $k$ out of engagement with the teeth of the ratchet-wheel $j$ and immediately this is done the reaction of the spring $r$ forces the clamp on and causes it to firmly hold the meat. With this arrangement of meat clamp the usual uprights are dispensed with and the table left quite free for the insertion or removal of meat.

Having now fully described my invention what I claim and desire to secure by Letters Patent is:—

1. A meat clamp for meat slicing machines comprising, in combination, a clamp lever adapted to move through the arc of a circle, spring means for forcing down the clamp lever and ratchet wheel and pawl gear whereby the clamp lever can be retained out of engagement with the meat.

2. A meat clamp for meat slicing machines comprising, in combination, a clamp lever adapted to move through the arc of a circle, spring means for forcing down the clamp lever, ratchet wheel and pawl gear whereby the clamp lever can be retained out of engagement with the meat, and means fulcrumed to the clamp lever for disengaging the pawl from the ratchet wheel.

3. A meat clamp for meat slicing machines comprising, in combination, a clamp lever adapted to move through the arc of a circle, spring means for forcing down the clamp lever, ratchet wheel and pawl gear whereby the clamp lever can be retained out of engagement with the meat, and a hand lever fulcrumed to the clamp lever for disengaging the pawl from the ratchet wheel.

4. A meat clamp for meat slicing machines comprising, in combination, a clamp lever adapted to move through the arc of a circle, spring means for forcing down the clamp lever, ratchet wheel and pawl gear whereby the clamp can be retained out of engagement with the meat, a pin in the pawl, and a hand lever pivoted to the back of the clamp and having a slot at one end which slot engages the pin of the pawl.

5. A meat clamp for meat slicing machines comprising, in combination, a clamp lever adapted to move through the arc of a circle, a screw for feeding forward the said clamp lever, spring means for holding the clamp lever down upon the meat, ratchet wheel and pawl gear whereby the clamp lever can be retained out of engagement with the meat, and means connecting the clamp lever and feed screw.

In testimony whereof I affix my signature in presence of two witnesses.

JOHANNES CORNELIS van BERKEL.

Witnesses:
CARL GUBLER,
ARTHUR J. BUNLEY.